No. 608,832. Patented Aug. 9, 1898.
G. W. BUSH.
SWITCH KEEPER.
(Application filed Dec. 3, 1897.)
(No Model.)
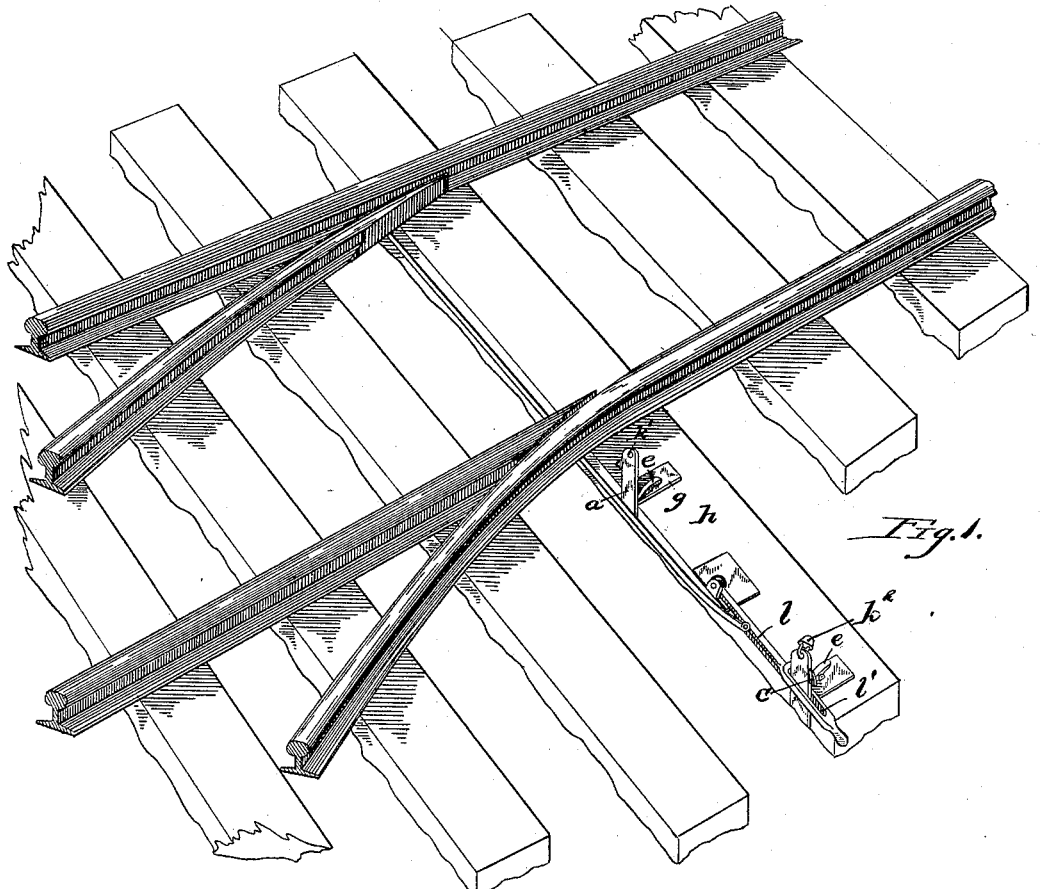
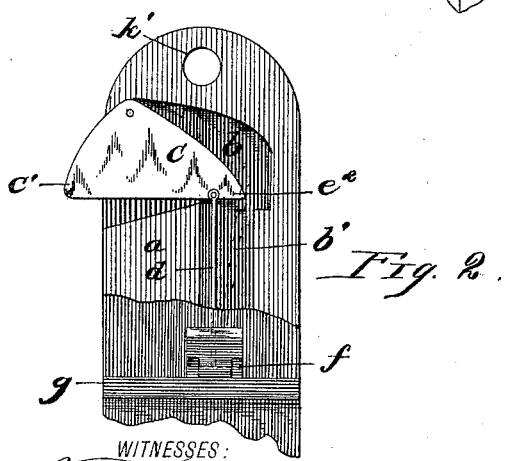
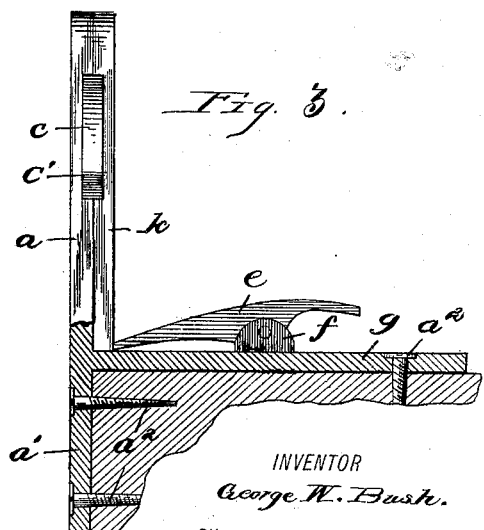
WITNESSES:
INVENTOR
George W. Bush.
BY
ATTORNEY.

UNITED STATES PATENT OFFICE.

GEORGE W. BUSH, OF TURTLE CREEK, PENNSYLVANIA.

SWITCH-KEEPER.

SPECIFICATION forming part of Letters Patent No. 608,832, dated August 9, 1898.

Application filed December 3, 1897. Serial No. 660,628. (No model.)

*To all whom it may concern:*

Be it known that I, GEORGE W. BUSH, a citizen of the United States of America, residing at Turtle Creek, in the county of Allegheny and State of Pennsylvania, have invented certain new and useful Improvements in Switch-Keepers, of which the following is a specification, reference being had therein to the accompanying drawings.

This invention relates to certain new and useful improvements in switch-keepers, and has for its object to provide novel and effective means for locking the switch-lever in its position.

The invention further aims to provide a switch-keeper for the above purpose that may be so arranged with respect to the switch and track that the switchman or operator may operate the lever from a position wherein he will be facing the coming train at all times.

The principal features of the invention consist in the pivoted dog or pawl arranged within the keeper and which has attached thereto a rod that is engaged by a foot-lever pivotally supported on the bed-plate attached to the cross-tie, this foot-lever and rod serving as a means whereby the pivoted dog or pawl is operated so as to force the same wholly within the keeper and permit the same entering or withdrawing from the slot of the switch-lever, all of which construction will be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a perspective view of a portion of the track-switch, showing my improved switch-keeper in position. Fig. 2 is a front elevation of the keeper with the covering-plate for the pivoted dog or pawl removed. Fig. 3 is a partial side and partial sectional view of my improved keeper.

Referring now to the drawings by reference-letters, $a$ indicates the upright standard or bar, which I will term the "keeper" and which is provided on its one face with a cut-away portion or recess $b$, at the upper edge of which is pivotally secured the pawl or dog $c$, which is of less dimensions than the cut-away portion or recess $b$, so that when the same is operated this dog or pawl may be drawn wholly within the recess. The said dog or pawl rests normally with its end $c'$ projecting outward beyond the edge of the plate or bar $a$, in which position it is retained by means of a vertical rod $d$, attached to the said pawl or dog near its end $c^2$, the said rod extending downward and operating in and terminating the vertical slot or recess $b'$ of the recess $b$, with its lower end resting against the inner end of the foot-lever $e$, which is pivotally supported in lugs $f$, formed therefor on the bed-plate $g$, which is formed integral with the vertical bar or plate $a$ and is adapted to lie on the upper face of the cross-tie $h$. That portion $a'$ of the bar or plate $a$ extends downward beyond the point of intersection of the bed-plate $g$ with the bar $a$, so that the same may be secured rigidly to the side of the cross-tie $h$, which may be accomplished by means of screws or bolts $a^2$, which are also employed for fastening the bed-plate to the upper face of the cross-tie. The dog or pawl $c$ and its operating-rod $d$ are protected by means of the covering or fastening plate $k$, which is attached to the plate $a$ in any suitable manner, both the plate $k$ and the plate $a$ being provided near their upper ends with an aperture $k'$ to receive the padlock $k^2$ for locking the switch. The switch-lever $l$ is or may be secured to the cross-tie in the ordinary manner, and the slot $l'$ in said lever is made of sufficient length, so that the same will pass downward over the keeper as it describes its movement, and as the same is passing over the said keeper it compresses the dog or pawl $c'$ within its recess until it has passed beyond the same, when the end $c^2$, to which the rod $d$ is attached, being heavier than the end $c'$ of the dog or pawl, will cause this end $c'$ to be forced outwardly from the keeper and prevent the switch-lever being returned to its former position until the dog is retracted within its recess, which is accomplished by means of the pressure of the foot-lever $e$, will cause the said lever to exert a pressure on the end of the rod $d$, forcing the end $c^2$ of the dog $c$ upwardly and withdrawing the end $c'$ from within the keeper or flush with the edge of the same, so that the switch-lever will readily pass over the keeper.

One of these keepers is of course provided for each position of the switch, and while the construction as herein shown and described appears to embody the preferred form of my invention, yet I do not wish to limit myself to the exact construction shown, but reserve the right to change the same as may be found necessary and as is within the scope of the protection prayed for.

Having fully described my invention, what I claim as new, and desire to secure by Letters Patent, is—

1. A switch-keeper comprising a vertical bar or plate having a horizontal bed-plate formed integral therewith said vertical bar being provided on its one face with a recess within which is pivoted a dog or pawl, a rod connected to the inner end of said pawl, and a foot-lever pivotally supported on the bed-plate and engaging the lower end of the rod to operate the pawl or dog and draw the same within the vertical plate, substantially as shown and described.

2. In a switch-keeper, the combination with a switch-lever provided with a slot, of a keeper comprising a vertical and horizontal plate attached to the cross-tie, said vertical plate having a pivoted pawl or dog arranged therein, with its one end projecting normally beyond the edge of the vertical plate, a rod connected to said plate and the foot-lever pivotally supported on the horizontal plate and engaging the lower end of the rod to operate the pivoted pawl or dog, substantially as shown and described.

In testimony whereof I affix my signature in presence of two witnesses.

GEORGE W. BUSH.

Witnesses:
JOHN NOLAND,
THOS. M. BOYD, Jr.